United States Patent [19]

Kruka et al.

[11] Patent Number: 4,920,523

[45] Date of Patent: Apr. 24, 1990

[54] HYDROPHONE MOUNT

[75] Inventors: Vitold R. Kruka; Robert M. Kipp; Edward R. Cadena, all of Houston

[73] Assignee: Shell Oil Company, Houston, Tex.

[21] Appl. No.: 333,527

[22] Filed: Dec. 22, 1981

[51] Int. Cl.$^5$ .................................... H04R 11/00
[52] U.S. Cl. .................................... 367/188; 367/154
[58] Field of Search .............. 367/152, 154, 157, 165, 367/166, 82, 155, 173, 188; 339/47 R, 49 R; 181/122; 174/70 R, 70 S; 403/14

[56] References Cited

U.S. PATENT DOCUMENTS

| | | | |
|---|---|---|---|
| 2,762,032 | 9/1956 | Vogel | 367/154 |
| 3,434,104 | 3/1969 | Stapleton et al. | 367/154 |
| 4,109,757 | 8/1978 | Hebbard | 367/188 |
| 4,204,188 | 5/1980 | Weichart et al. | 367/154 |
| 4,300,218 | 11/1981 | Kruka et al. | 367/165 |
| 4,390,976 | 6/1983 | Eynck | 367/173 |
| 4,523,303 | 6/1985 | Lenhardt | 367/20 |

*Primary Examiner*—Thomas H. Tarcza
*Assistant Examiner*—Gregory C. Issing

[57] ABSTRACT

A hydrophone mount for use in a marine seismic cable having a central core, such mount comprising: a first housing portion having first and second apertures, first and second edges, and a cavity adapted for holding a hydrophone; a second housing portion having first and second apertures and first and second edges, the first and second housing portions being sized and shaped so that the first and second housing portions can be positioned adjacent to the core to form a housing around the core with the first edge of the first housing portion interlocking with the first edge of the second housing portion, the second edge of the first housing portion interlocking with the second edge of the second housing portion, and the first and second apertures of the first housing portion axially aligning respectively with the first and second apertures of the second housing portion; and a first member positioned in the aligned first apertures and a second member positioned in the aligned second apertures.

12 Claims, 2 Drawing Sheets

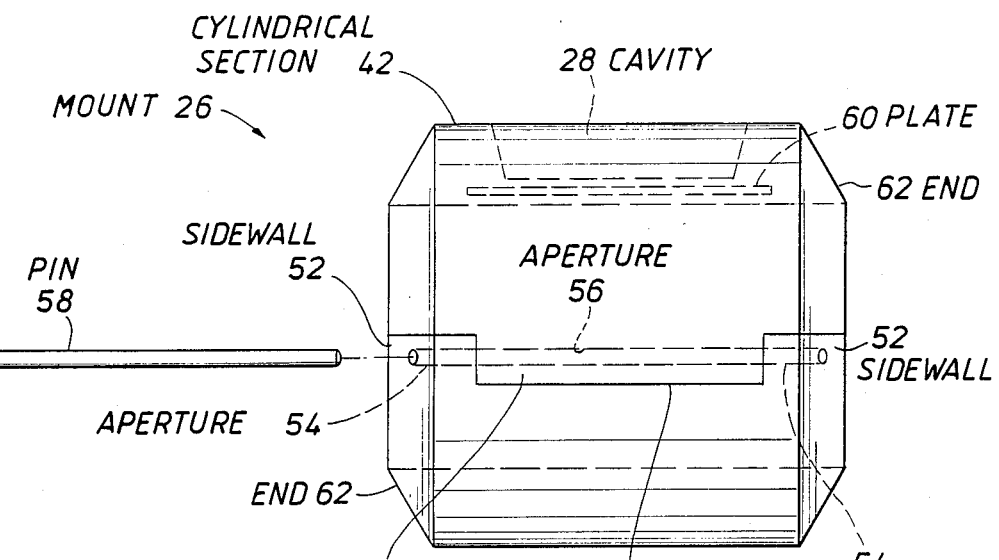
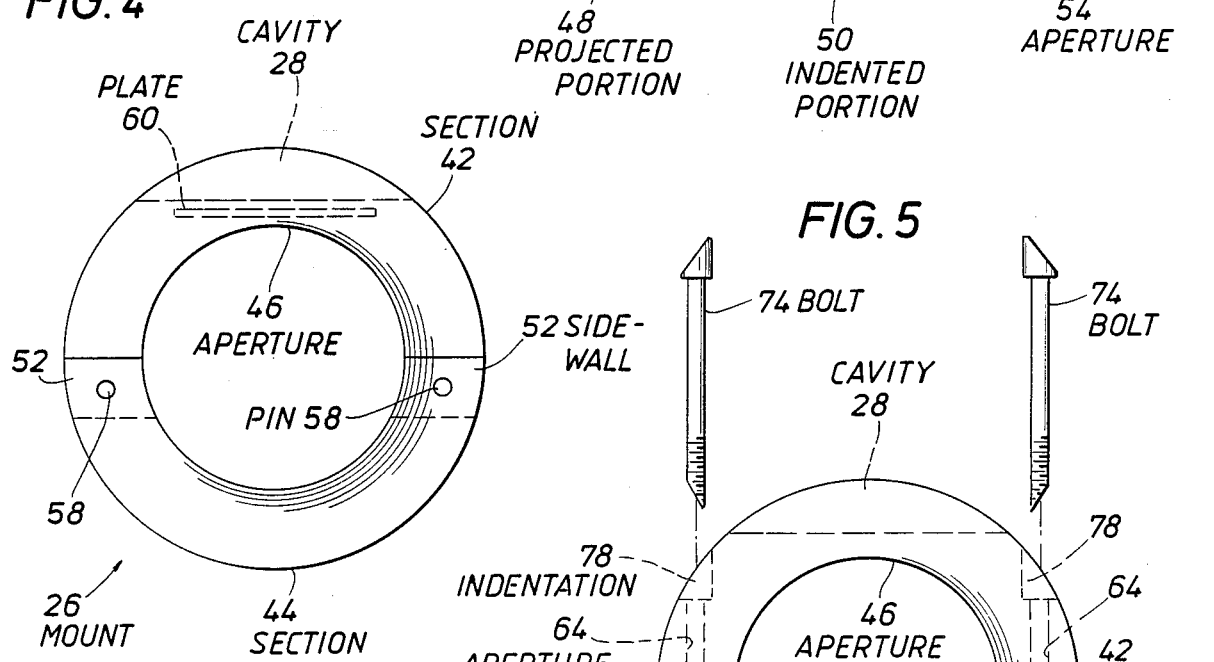
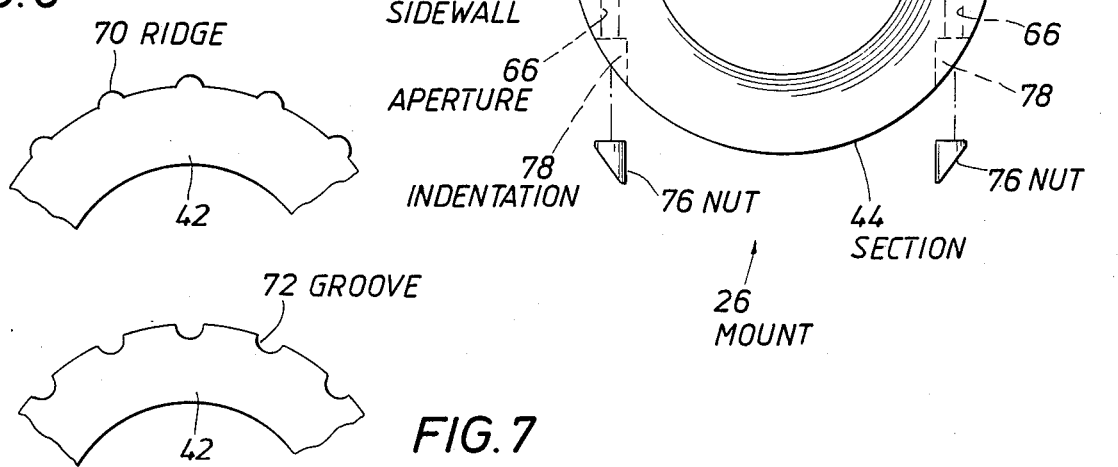

HYDROPHONE MOUNT

BACKGROUND OF THE INVENTION

This invention relates generally to seismic exploration of substrata beneath bodies of water and, more particularly, to a hydrophone mount for use in a seismic streamer for exploring such substrata.

Marine seismic exploration is often conducted by towing a seismic streamer at a given depth through the ocean or other body of water. The streamer is provided with a plurality of acoustic sensitive transducers or hydrophones disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the velocity propagation characteristics of the stratum. The hydrophones sense the acoustic pressure waves produced in the water by the upwardly traveling seismic reflections and provide electrical signals indicative thereof to suitable processing and recording equipment located on the seismic vessel that is towing the streamer.

The prior art has employed various types of mounts to position the hydrophones at discrete locations along the seismic cable. For example, partial mounts, such as that disclosed in Sawin et al., U.S. Pat. No. 3,781,778, have been employed in foam-filled cables. Full mounts have also been utilized with foam-filled cables since such mounts provide a more secure, that is, less noisy, mounting for the hydrophone and present a smaller possibility of damage to the jacket and electrical wires of the cable core than partial mounts. Full mounts have consisted essentially of a cylindrical mount that has been cut in half with the two halves being positioned around the cable core and fastened together by epoxy and the like. Generally, the installation of these mounts has been time-consuming, because they must be secured until the proper adhesive bond has been formed. In addition, the removal of such mounts may be extremely difficult and may result in damage to the mount because of the strong adhesive bond between the two halves.

Accordingly, it is an object of the present invention to provide a full hydrophone mount that is easily assembled and disassembled and is suitable for use with a foam-filled cable or any cable having a central core.

SUMMARY OF THE INVENTION

In accordance with the present invention there is provided a hydrophone mount for use in a marine seismic cable having a central core; the mount comprises first and second housing portions that have interlocking edges. The first housing portion has first and second apertures, first and second edges and a cavity adapted for holding a hydrophone. The second housing portion has first and second apertures and first and second edges. The two housing portions are sized and shaped so that they can be positioned adjacent to the cable core to form a housing around the core. The first edge of the first housing portion interlocks with the first edge of the second housing portion, and the second edge of the first housing portion interlocks with the second edge of the second housing portion. In addition, the first and second apertures of the first housing portion axially align respectively with the first and second apertures of the second housing portion. A first member is positioned in the aligned first apertures, and a second member is positioned in the aligned apertures.

The mating edges of the two housing portions interlock by means of at least one indented portion, which is located on one edge, and a corresponding projected portion, which is located on the other edge and is shaped to mate with the indented portion. The two members or locking pins are inserted in the axially aligned apertures in the two halves to prevent the halves from separating. The locking pins can be for example, a pin or rod, a toggle or a bolt and nut. The apertures and locking pins may be positioned at different locations in the mount. For example, they can be positioned horizontally through the indented and projected portions, or they can be positioned vertically through the two halves. The locking pins facilitate assembly and disassembly of the mount, since they are easily inserted into and removed from the apertures. The interlocking edges in combination with the locking pins prevent relative motion between the two halves of the mount to eliminate any friction noise that would be caused by such relative movement.

The mount can be made of any strong, lightweight material, such as polyurethane with embedded hollow glass microspheres. A cavity is provided on the outside surface of the mount for potting a hydrophone in the usual manner. If desired, the bottom of the cavity can be reinforced with a rigid plate to provide the mount with greater strength and stiffness to ensure that the cable core does not apply pressure to the hydrophone and cause spurious signals when the cable bends during towing.

Preferably, the ends of the mount are slanted to reduce the possibility of damage to the cable when it is bent at an extreme angle, such as when it is stored on a spool. The slanted edges also facilitate the extrusion of the flotation body in the manufacture of foam-filled cables. In addition, ridges or grooves may be provided on the exterior of the mount to provide a better bonding surface between the mount and the extruded jacket or sheath of the cable. The ridges or grooves anchor the mount more firmly to the jacket to prevent the stress waves that are propagated along the jacket from being transmitted to the hydrophone and resulting in undesired noise in the output signal of the hydrophone.

Other objectives, advantages and applications of the present invention will be made apparent by the following detailed description of the preferred embodiments of the present invention.

BRIEF DESCRIPTION OF THE DRAWINGS

FIG. 3 is a side elevational view of the hydrophone mount of the present invention prior to incorporation into the seismic cable.

FIG. 4 is an end elevational view of the hydrophone mount shown in FIG. 3.

FIG. 5 is an end elevational view of an alternative embodiment of the present invention.

FIG. 6 is a fragmentary view in elevation of an alternative embodiment of the present invention.

FIG. 7 is a fragmentary view in elevation of an alternative embodiment of the present invention.

DETAILED DESCRIPTION OF THE PREFERRED EMBODIMENTS

Figure 1:
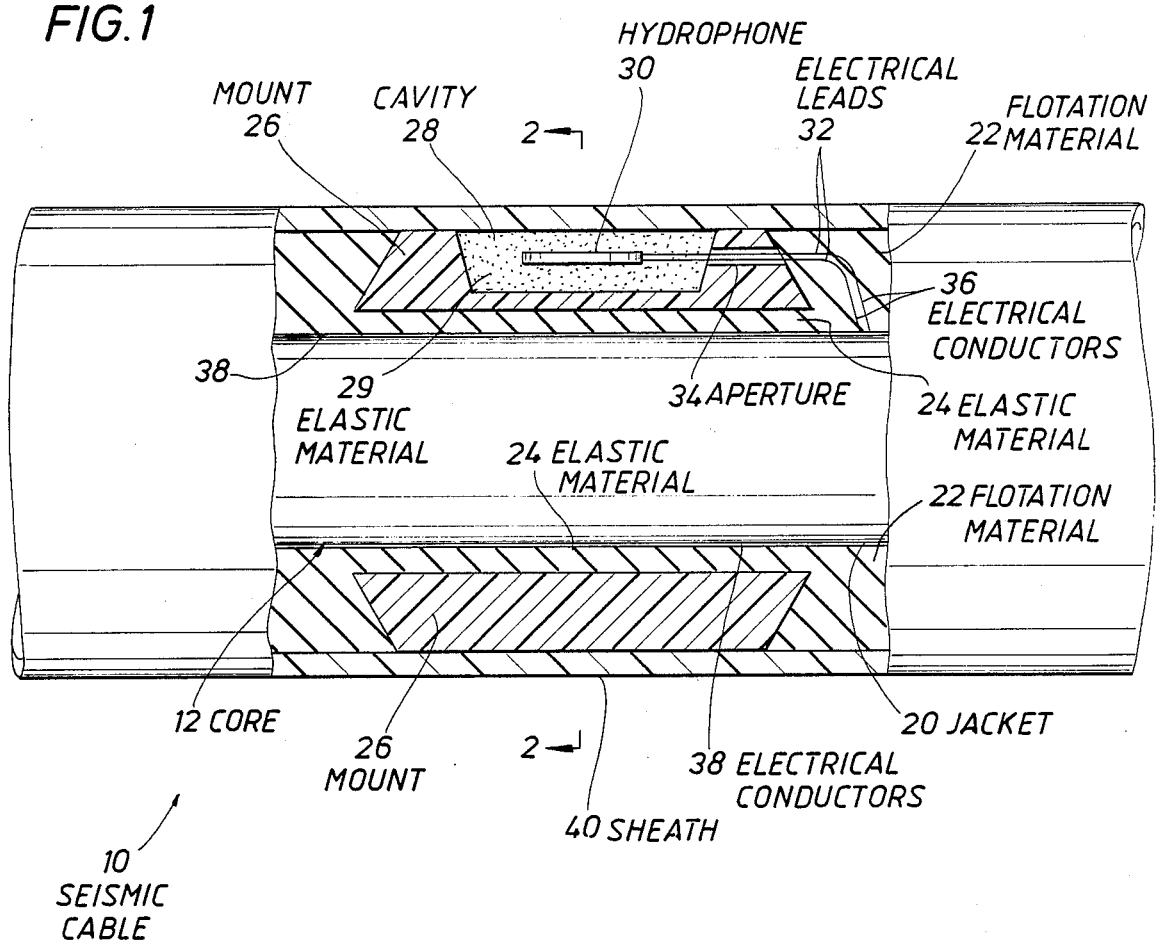
FIG. 1 is a sectional view in side elevation of a marine seismic cable utilizing the present invention.
Figure 2:
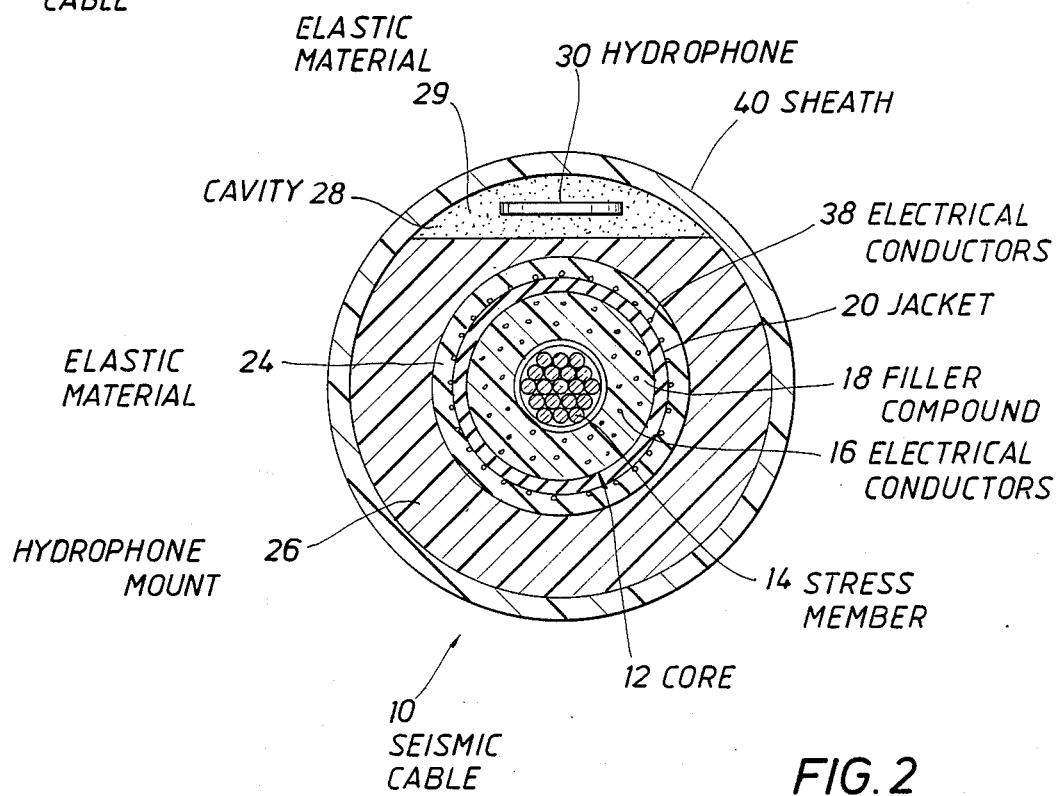
FIG. 2 is a cross section taken along line 2—2 of FIG. 1.

Referring to FIGS. 1 and 2, a section of marine seismic cable incorporating the hydrophone mount of the present invention is indicated generally by numeral 10. Cable 10 has a core 12 which consists of a stress member 14, which may be a flexible steel cable or a synthetic fiber rope, and a plurality of electrical conductors 16 disposed around stress member 14. The voids between conductors 16 are filled with a suitable filler compound 18, and a jacket 20 of urethane or other suitable material is extruded over the outer portion of conductors 16 and filler 18. At discrete locations along cable 10 a hydrophone mount 26 is positioned around core 12. Core 12 is disposed axially within a cylindrical body of flotation material 22, such as soft urethane having embedded glass or plastic microspheres or balloons, to provide the desired buoyancy. The outside diameter of mount 26 is essentially the same as the outside diameter of flotation material 22. It should be noted that the foam-filled cable is served by way of example and not limitation, since the novel aspects of the present invention can be utilized in any cable having a central stress member. Preferably, a thin layer 24 of elastic material is positioned between mount 26 and core 12 to decouple the hydrophone from longitudinal waves and other noise that is propagated along core 12, and the relative sizes of core 12, thin layer 24 of elastic material and mount 26 are defined by the equation:

$$R_1 R_3^2 + R_1 R_2^2 - 2R_2^3 = O$$

where $R_1$ is the radius of core 12 and $R_2$ and $R_3$ are the inside and outside radii respectively of mount 26, as disclosed in our U.S. Pat. No. 4,510,588, Issued Apr. 9, 1985, which was filed on the same day as the instant application and is assigned to a common assignee.

Mount 26 which can be made of any strong, lightweight material, such as rigid polyurethane with embedded hollow glass spheres, has a cavity 28 which is filled with a moldable elastic material 29 having acoustic properties similar to those of the marine environment, such as polysulfide elastomer. Hydrophone 30 is positioned in elastic material 29 such that it is displaced from the walls of cavity 28. Electrical leads 32 from hydrophone 30 are brought out through aperture 34 in the wall of mount 26 and are connected in a suitable manner to a pair of electrical conductors 36 from the set of electrical conductors 38 provided by the termination (not shown) of this cable section. A sheath 40 of, for example, polyurethane plastic, is extruded over flotation material 22 and mount 26 to provide a relatively smooth and damage resistant outer surface.

In addition, cable 10 may include a rigid shield attached to mount 26, as disclosed in our U.S. Pat. No. 4,837,571, Issued June 6, 1989 or a wavelength filter, as described in the copending U.S. patent application Ser. No. 333,524, now U.S. Statutory Invention Registration No. H387 issued Dec. 1, 1987 of Kruka and Cadena, Attorney Docket No. K-8716, both of which were filed on the same day as the instant application and are assigned to a common assignee, to prevent pressure fluctuations occurring at or near the surface of cable 10 from propagating through elastic material 29 to hydrophone 30.

Referring to FIGS. 3 and 4, mount 26 is shown prior to incorporation into cable 10. Mount 26 has two cylindrical sections 42 and 44 which mate to form a cylinder having an aperture 46 to accommodate the cable core. Each edge of section 42 has a projected portion 48 which mates and interlocks with the respective indented portion 50 formed on each edge of section 44 by sidewalls 52. Each sidewall 52 has a horizontal aperture 54 which axially aligns with horizontal aperture 56 through projected portion 48 to form a continuous horizontal aperture through mount 26. A pin 58, which may be made of any strong, lightweight material, such as aluminum, is inserted through each of the continuous apertures formed by apertures 54 and 56 to connect section 42 to section 44. Section 42 has cavity 28 for holding a hydrophone in the usual manner as shown in FIGS. 1 and 2. A thin, rigid plate 60, which can be made of steel or other rigid material, can be positioned in section 42 beneath cavity 28 to provide section 42 with greater strength and stiffness to ensure that the cable core does not apply pressure to the hydrophone positioned in cavity 28 when the cable bends during towing.

The interlocking edges of sections 42 and 44 may take various other embodiments. For example, section 42 can have one edge with a projected portion and the other edge with an indented portion and similarly for section 44, or the indented portion of either section may have only one sidewall with the projected portion of the corresponding edge of the other section being shaped accordingly to mate and interlock. Preferably, ends 62 of sections 42 and 44 are slanted to minimize the possibility of damage to the cable when it is bent at an extreme angle, such as when it is stored on a spool.

Referring to FIG. 5, which illustrates an alternative embodiment of the present invention with like numerals indicating like parts, sections 42 and 44 can have vertical apertures 64 and 66 respectively which axially align to form continuous vertical apertures through mount 26 on opposite sides of aperture 46. Bolts 74 are inserted through aligned apertures 64 and 66 and nuts 76 are mated therewith and tightened to connect section 42 to section 44. Preferably, the surface of sections 42 and 44 are provided with indentations 78 around apertures 64 and 66 to accommodate the heads of bolts 74 and nuts 76, and the heads of bolts 74 and nuts 76 are shaped to correspond with the shapes of sections 42 and 44 to form a relatively smooth surface as indicated in FIG. 5. Any residual space between the heads of bolts 74 and nuts 76 and sections 42 and 44 can be filled in with an elastic material, such as polysulfide elastomer. In this embodiment at least two sets of apertures 64 and 66 are employed; such sets can be located, for example, in the middle of each of sections 42 and 44 or at opposite ends thereof. Preferably, four sets of apertures 64 and 66 are employed with two sets being located at each end of sections 42 and 44.

FIG. 6 discloses ridges 70 and FIG. 7 discloses grooves 72 on the surface of section 42 to provide a better bonding surface between mount 26 and the cable jacket. Similarly, ridges 70 or grooves 72 can be provided on the surface of section 44. In various embodiments, either ridges 70 or grooves 72 or both can be provided on either section 42, section 44 or both to anchor mount 26 more firmly to the cable jacket to prevent the stress waves that are propagated along the jacket from being transmitted to the hydrophone held by mount 26.

It is to be understood that variations and modifications of the present invention can be made without departing from the scope of the invention. It is also to be understood that the scope of the invention is not to be interpreted as limited to the specific embodiments disclosed here, but only in accordance with the appended claims when read in light of the foregoing disclosure.

What is claimed is:

1. A hydrophone mount for use in a marine seismic cable having a central core, said mount comprising: a first housing portion having first and second apertures, first and second edges, and a cavity adapted for holding a hydrophone; a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and said first and second apertures of said first housing portion axially aligning respectively with said first and second apertures of said second housing portion; and a first member positioned in said aligned first apertures and a second member positioned in said aligned second apertures.

2. A hydrophone mount as recited in claim 1, wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges.

3. A hydrophone mount as recited in claim 2, wherein said first and second housing portions having first sides that are positioned adjacent to said core and second sides that are opposite said first sides, said first sides being longer than said second sides so that the ends of said first and second housing portions are slanted.

4. A hydrophone mount for use in a marine seismic cable having a central core, said mount comprising:
   a first housing portion having first and second apertures, first and second edges, and a cavity adapted for holding a hydrophone;
   a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and said first and second apertures of said first housing portion axially aligning respectively with said first and second apertures of said second housing portion; and
   a first member positioned in said aligned first apertures and a second member positioned in said aligned second apertures;
   wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges, and wherein said first and second housing portions have first sides that are positioned adjacent to said core and second sides that are opposite said first sides, and at least one of said second sides has a groove.

5. A hydrophone mount for use in a marine seismic cable having a central core, said mount comprising:
   a first housing portion having first and second apertures, first and second edges, and a cavity adapted for holding a hydrophone;
   a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and said first and second apertures of said first housing portion axially aligning respectively with said first and second apertures of said second housing portion; and
   a first member positioned in said aligned first apertures and a second member positioned in said aligned second apertures;
   wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges, and wherein said first and second housing portions have first sides that are positioned adjacent to said core and second sides that are opposite said first sides, and at least one of said second sides has a projection.

6. A hydrophone mount for use in a marine seismic cable having a central core, said mount comprising:
   a first housing portion having first and second apertures, first and second edges, and a cavity adapted for holding a hydrophone and having a rigid plate positioned therein between the bottom of said cavity and the side of said first housing portion that is positionable adjacent to said core;
   a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges, and said first and second apertures of said first housing portion axially aligning respectively with said first and second apertures of said second housing portion; and a first member positioned in said aligned first apertures and a second member positioned in said aligned second apertures.

7. A hydrophone mount for use in a marine seismic cable having a central core, said mount comprising:

a first housing portion having first and second apertures, first and second edges, and a cavity adapted for holding a hydrophone;

a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and said first and second apertures of said first housing portion axially aligning respectively with said first and second apertures of said second housing portion; and a first member positioned in said aligned first apertures and a second member positioned in said aligned second apertures;

wherein one of said first edges of said first and second housing Portions has an indented portion and the other has a projected portion shaped to mate with said indented portion of said one of said first edges, and one of said second edges of said first and second housing portions has an indented portion and the other has a projected portion shaped to mate with said indented portion of said one of said second edges, and wherein said first and second housing portions have first sides that are positioned adjacent to said core and second sides that are opposite said first sides, said first sides being longer than said second sides so that the ends of said first and second housing portions are slanted, and at least one of said second sides has a groove.

8. A hydrophone mount for use in a marine seismic cable having a central core, said mount comprising:

a first housing portion having first and second apertures, first and second edges, and a cavity adapted for holding a hydrophone;

a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and said first and second apertures of said first housing portion axially aligning respectively with said first and second apertures of said second housing portion; and a first member positioned in said aligned first apertures and a second member positioned in said aligned second apertures;

wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges, and wherein said first and second housing portions have first sides that are positioned adjacent to said core and second sides that are opposite said first sides, said first sides being longer than said second sides so that the ends of said first and second housing portions are slanted, and at least one of said second sides has a projection.

9. A hydrophone mount for use in a marine seismic cable having a central core, said mount comprising:

a first housing portion having first and second apertures, first and second edges, and a cavity adapted for holding a hydrophone and having a rigid plate positioned therein between the bottom of said cavity and the side of said first housing portion that is positionable adjacent to said core;

a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges and wherein said first and second housing portions have sides that are positioned adjacent to said core and second sides that are opposite said first sides, said first sides being longer than said second sides so that the ends of said first and second housing portions are slanted, and at least one of said first sides has a groove, and said first and second apertures of said first housing portion axially aligning respectively with said first and second apertures of said second housing portion; and a first member positioned in said aligned first apertures and a second member positioned in said aligned second apertures.

10. A hydrophone mount for use in a marine seismic cable having a central core, said mount comprising:

a first housing portion having first and second apertures, first and second edges, and a cavity adapted for holding a hydrophone and having a rigid plate positioned therein between the bottom of said cavity and the side of said first housing portion that is positionable adjacent to said core;

a second housing portion having first and second apertures and first and second edges, said first and second housing portions being sized and shaped so that said first and second housing portions can be positioned adjacent to said core to form a housing around said core with said first edge of said first housing portion interlocking with said first edge of said second housing portion, said second edge of said first housing portion interlocking with said second edge of said second housing portion, and wherein one of said first edges of said first and second housing portions has an indented portion and the other has a projected portion shaped to mate with said indented portion of said one of said first edges, and one of said second edges of said first and second housing portions has an indented portion and the other has a projected portion shaped to mate with said indented portion of said one of said second edges and wherein said first and second housing portions have first sides that are positioned adjacent to said core and second sides that are opposite said first sides, said first sides being longer than said second sides so that the ends of said first and second housing portions are slanted, and at least one of said second sides has a projection, and said first and second apertures of said first housing portion axially aligning respectively with said first and second apertures of said second housing portion; and a first member positioned in said aligned first apertures and a second member positioned in said aligned second apertures.

11. A hydrophone mount as recited in claim 1, wherein said first and second housing portions are curved and said housing formed thereby is a cylinder.

12. A hydrophone mount as recited in claim 1, wherein said marine seismic cable further comprises a body of elastic material positioned around said core, and said first and second housing portions are positioned adjacent to said body of elastic material.

* * * * *